US009753771B2

(12) United States Patent
Lee et al.

(10) Patent No.: US 9,753,771 B2
(45) Date of Patent: Sep. 5, 2017

(54) SYSTEM-ON-CHIP INCLUDING MULTI-CORE PROCESSOR AND THREAD SCHEDULING METHOD THEREOF

(71) Applicant: SAMSUNG ELECTRONICS CO., LTD., Suwon-si, Gyeonggi-do (KR)

(72) Inventors: Gyeongtaek Lee, Suwon-si (KR); Seungkyu Kim, Sejong (KR); Jieun Park, Siheung-si (KR); WonJoon Jang, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/721,517

(22) Filed: May 26, 2015

(65) Prior Publication Data

US 2016/0062798 A1 Mar. 3, 2016

(30) Foreign Application Priority Data

Sep. 1, 2014 (KR) ........................ 10-2014-0115318

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01); *G06F 9/5033* (2013.01); *G06F 9/5094* (2013.01); *G06F 9/4856* (2013.01)

(58) Field of Classification Search
CPC ..................................................... G06F 9/4881
See application file for complete search history.

(56) References Cited

U.S. PATENT DOCUMENTS

| | | | | |
|---|---|---|---|---|
| 8,051,412 | B2 | 11/2011 | Kasahara et al. | |
| 8,650,554 | B2 | 2/2014 | Elnozahy et al. | |
| 8,782,645 | B2 | 7/2014 | Breternitz et al. | |
| 8,881,157 | B2 | 11/2014 | Wolfe et al. | |
| 2004/0049672 | A1 | 3/2004 | Nollet et al. | |
| 2011/0066828 | A1 | 3/2011 | Wolfe et al. | |
| 2012/0047514 | A1* | 2/2012 | Seo ....................... | G06F 9/4881 718/106 |
| 2012/0079235 | A1 | 3/2012 | Lyer et al. | |

(Continued)

FOREIGN PATENT DOCUMENTS

| | | |
|---|---|---|
| KR | 100936601 | 1/2010 |
| KR | 1020130067100 A | 6/2013 |

OTHER PUBLICATIONS

Chakraborty et al., Computation Spreading: Employing Hardware Migration to Specialize CMP Cores On-the-fly, 2006.*

(Continued)

*Primary Examiner* — Charlie Sun
(74) *Attorney, Agent, or Firm* — Volentine & Whitt, PLLC

(57) ABSTRACT

A scheduling method of a system-on-chip including a multi-core processor includes detecting a scheduling request of a thread to be executed in the multi-core processor, and detecting a calling thread having the same context as the scheduling-requested thread among threads that are being executed in the multi-core processor. The method includes reassigning or resetting the scheduling-requested thread according to performance of a core to execute the calling thread having the same context.

18 Claims, 9 Drawing Sheets

Start
Detect scheduling event — S110
S120 Event occured? No / Yes
Lookup threads having same context — S130
S140 Thread having Same context exist? No / Yes
S150 Select core in accordance with average load
S160 Running in low performance core than calling thread? No / Yes
S170 Core reconfiguration
Run the thread in selected core — S180
End

(56) References Cited

U.S. PATENT DOCUMENTS

| | | | | |
|---|---|---|---|---|
| 2012/0124582 | A1* | 5/2012 | Bello | G06F 9/5083 718/100 |
| 2012/0131588 | A1 | 5/2012 | Chung et al. | |
| 2013/0212594 | A1 | 8/2013 | Choi et al. | |
| 2013/0283277 | A1* | 10/2013 | Cai | G06F 1/329 718/102 |
| 2014/0013330 | A1* | 1/2014 | Wang | G06F 9/524 718/103 |
| 2014/0173623 | A1* | 6/2014 | Chang | G06F 9/5088 718/105 |
| 2015/0121103 | A1* | 4/2015 | Kanemasa | G06F 1/324 713/322 |
| 2015/0379668 | A1* | 12/2015 | Weissmann | G06F 9/5044 345/522 |

OTHER PUBLICATIONS

Arm, big.LITTLE Technology: The Future of Mobile, 2013.*

Koufaty, David, Dheeraj Reddy, and Scott Hahn. "Bias scheduling in heterogeneous multi-core architectures." Proceedings of the 5th European conference on Computer systems. ACM, 2010.*

Turner, Paul et al., "CPU bandwidth control for CFS," Proceedings of the Linux Symposium, Jul. 13-16, 2010, Ottawa, Ontario, Canada, pp. 245-254.

* cited by examiner

SYSTEM-ON-CHIP INCLUDING MULTI-CORE PROCESSOR AND THREAD SCHEDULING METHOD THEREOF

CROSS-REFERENCE TO RELATED APPLICATIONS

This US non-provisional patent application claims priority under 35 USC §119 to Korean Patent Application No. 10-2014-0115318, filed on Sep. 1, 2014, the disclosure of which is incorporated by reference in its entirety herein.

BACKGROUND

Technical Field

Embodiments of the present disclosure relate to semiconductor devices and, more particularly, to a system-on-chip (SoC) including a multi-core processor and a thread management method thereof.

Discussion of Related Art

The use of mobile devices such as smartphones, digital cameras, MP3 players, and personal digital assistants (PDAs) is rapidly growing in recent years. As the driving of multimedia and throughput of various types of data increase in such mobile devices, adoption of a high-speed processor and a mass storage medium is expanding. Various application programs are driven in a mobile device. In a mobile device, semiconductor devices such as an operation memory (e.g., DRAM), a nonvolatile memory, and an application processor (hereinafter referred to as "AP") are used to drive various application programs. However, the integration density and driving frequencies of these semiconductor devices are increasing based upon on a demand for high performance in the mobile environment.

In a mobile device, an application processor uses a multi-core processor for providing high performance. Multi-core processors may be classified into a homogeneous multi-core processor and a heterogeneous multi-core processor. A homogeneous multi-core processor may include multi-cores of the same performance or the same size. A heterogeneous multi-core processor includes cores of different sizes or different performances.

Particularly, a heterogeneous multi-core processor may be managed in a switching manner of a high-performance cluster and a low-performance cluster depending on a task load. The heterogeneous multi-core processor may be controlled such that cores of different clusters process a plurality of threads at the same time. However, a manner of simultaneously driving cores of different performances during a specific operation may result in performance deterioration as compared to the cluster switching manner.

SUMMARY

Example embodiments of the disclosure provide a scheduling method of a system-on-chip including a multi-core processor. In an example embodiment, the scheduling method may include detecting a scheduling request of a thread to be executed in the multi-core processor, detecting a calling thread having a same context as the scheduling-requested thread among threads that are being executed in the multi-core processor, and adjusting (e.g. reassigning or resetting) the scheduling-requested thread according to the performance of a core assigned to execute the calling thread having the same context.

Example embodiments of the disclosure provide a system-on-chip. In an example embodiment, the system-on-chip may include a multi-core processor including a plurality of cores having different processing speeds, and an operation or working memory to which an operating system and an application program driven by the multi-core processor are loaded. The operating system may include a scheduler configured to assign a core to execute a thread according to a scheduling request of the thread generated at the application program. The scheduler is configured to select or set a core to execute the scheduling-requested thread based upon a detection of whether there is a thread having the same context as the scheduling-requested thread among a plurality of threads that are already being executed in the multi-core processor.

Example embodiments of the present disclosure provide a thread scheduling method of a multi-core processor. In an example embodiment, the thread scheduling method may include determining whether there is a thread sharing the same context among threads that are being executed in the multi-core processor, determining whether threads sharing the same context are distributed to different cores to be executed therein, respectively, and migrating a thread executed in a low-speed core, among the threads sharing the same context, to a high-speed one of the different cores.

BRIEF DESCRIPTION OF THE DRAWINGS

The accompanying drawings are included to provide a further understanding of the disclosure, and are incorporated in and form a part of this specification. The drawings illustrate exemplary embodiments of the disclosure and, together with the description, serve to explain principles of the disclosure. In the drawings.

DETAILED DESCRIPTION

Figure 1:
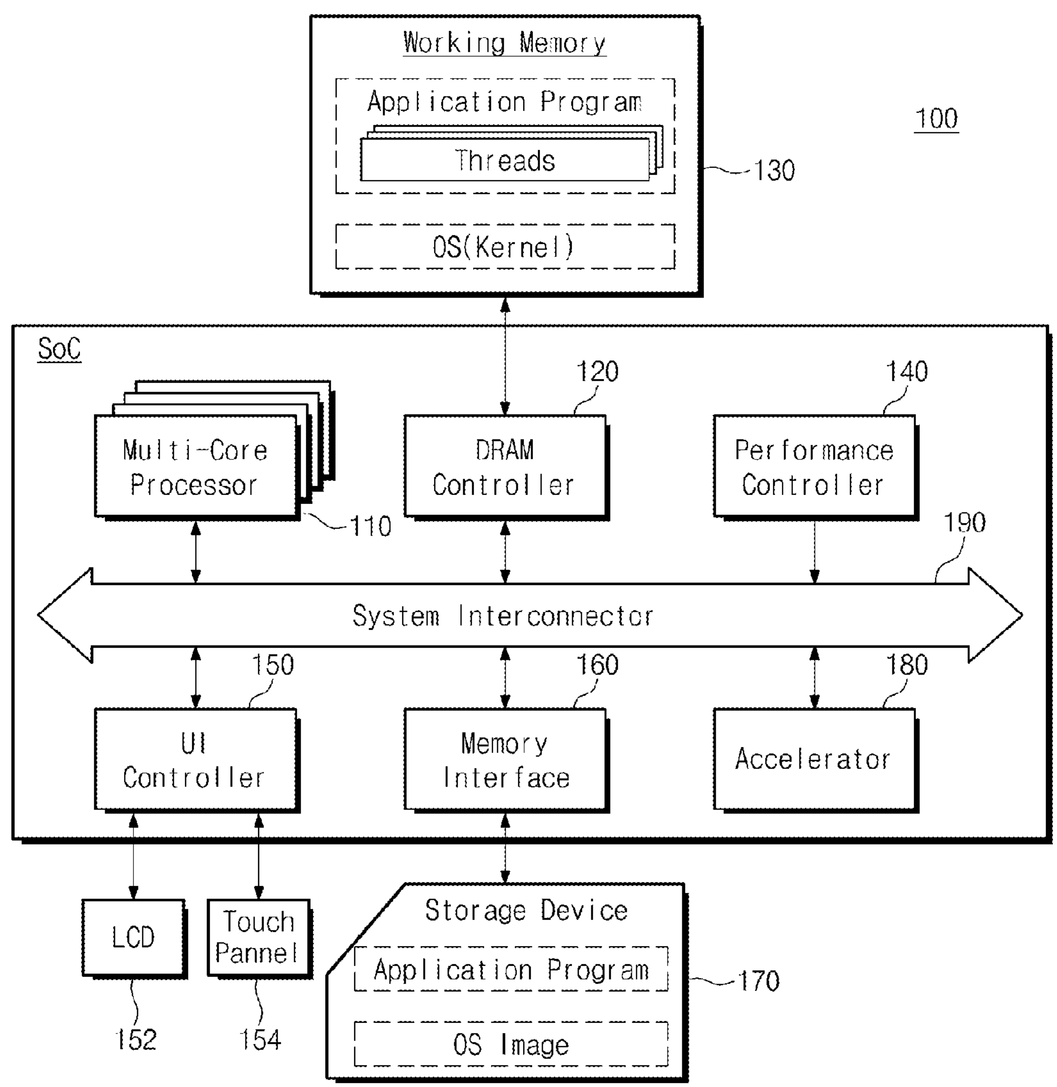
FIG. 1 is a block diagram of a mobile device according to an embodiment of the inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of a mobile device 100 according to an embodiment of the inventive concept. As illustrated, the mobile device 100 may include a system-on-chip (SoC) and operation or working memory 130, a liquid crystal display (LCD) 152, a touch panel 154, and a storage device 170. The system-on-chip (SoC) may include a multi-core processor 110, a DRAM controller 120, a performance controller 140, a user interface (UI) controller 150, a memory interface 160, and an accelerator 180. It will be understood that components of the mobile device 100 are not limited to the components shown in the figure. For example, the mobile device 100 may further include a hardware codec for processing image data, security block, and the like.

The multi-core processor 110 executes software (application program, operating system (OS), and device drivers) to be executed in the mobile device 100. The multi-core processor 110 may execute various application programs to be driven based on the operating system (OS). The multi-core processor 110 may be provided as a homogeneous multi-core processor or a heterogeneous multi-core processor.

Each of the multi-cores of the multi-core processor 110 includes a plurality of power domains operated by an independent driving clock and an independent driving voltage. A driving voltage and a driving clock provided to each of the multi-cores may be cut off or connected in units of cores. In each of the multi-cores, a frequency of a driving clock and a level of a driving voltage may vary depending on a processing load of each core. That is, each core may be controlled in a dynamic voltage frequency scaling (hereinafter referred to as "DVFS") manner in which a frequency of a driving clock or a level of a driving voltage increases depending on a size of a load.

In particular, when a single thread is scheduled to the multi-core processor 110, it is detected whether the scheduled thread has the same context as a thread executed in a high-performance core. A thread determined to share a context with the thread executed in the high-performance core may be subjected to thread migration to be executed in the high-performance core. This scheduling may be performed at a kernel of the operating system (OS).

The DRAM controller 120 provides interfacing between the working memory 130 and the system-on-chip (SoC). The DRAM controller 120 may access the working memory 130 according to a request of the multi-core processor 110 or another intellectual property (IP). For example, the DRAM controller 120 may write data into the working memory 130 according to a write request of the multi-core processor 110. Alternatively, the DRAM controller 120 may read data from the working memory 130 according to a read request and transmit the read data to the multi-core processor 110 or the memory interface 160 via a data bus.

The operating system (OS) or application programs may be loaded to the working memory 130 during a booting operation. For example, an OS image stored in the storage device 170 is loaded to the working memory 130 according to a booting sequence during a booting operation of the mobile device 100. The overall input/output operations of the mobile device 100 may be supported by the operating system (OS). Similarly, application programs may be loaded to the working memory 130 to be selected by a user or to provide basic services. Moreover, the working memory 130 may be used as a buffer memory to store image data provided from an image sensor such as a camera. The working memory 130 may be a volatile memory such as a static random access memory (SRAM) and a dynamic random access memory (DRAM) or a nonvolatile memory such as a PRAM, an MRAM, an ReRAM, an FRAM and a NOR flash memory.

The performance controller 140 may adjust operation parameters of the system-on-chip (SoC) according to a control request provided from a kernel of the operating system (OS). For example, the performance controller 140 may adjust a level of DVFS to enhance the performance of the system-on-chip (SoC). Alternatively, the performance controller 140 may control a driving mode such as Big.LITTLE™ of the multi-core processor 110 according to a request of the kernel. In this case, the performance controller 140 may further include a performance table 142 to set a driving voltage and a frequency of a driving clock.

The user interface controller 150 controls user input and output from user interface devices. For example, the user interface controller 150 may display a keyboard screen or the like for inputting data to the LCD 152 according to the control of the multi-core processor 110. Alternatively, the user interface controller 150 may control the LCD 152 to display data that a user requests. The user interface controller 150 may decode data provided from a user interface device such as a touch panel 154 as input data.

The memory interface 160 accesses the storage device 170 according to a request of the multi-core processor 110. That is, the memory interface 160 provides interfacing between the system-on-chip (SoC) and the storage device 170. For example, data processed by the multi-core processor 110 is stored in the storage device 170 through the memory interface 160. In other embodiments, data stored in the storage device 170 may be provided to the multi-core processor 110 through the memory interface 160.

The storage device 170 is provided as a storage medium of the mobile device 100. The storage device 170 may store application programs, an operating system (OS) image, and various types of data. The storage device 170 may be provided as a memory card (MMC, eMMC, SD, MicroSD, etc.). The storage device 170 may include a NAND-type flash memory having a high-capacity storage capability. Alternatively, the storage device 170 may include the next-generation nonvolatile memory such as PRAM, MRAM, ReRAM, and FRAM or a NOR-type flash memory. In other embodiments, the storage device 170 may be an embedded memory that is embedded in the system-on-chip (SoC).

The accelerator 180 may be provided to a separate intellectual property (IP) to enhance processing speed of multimedia or multimedia data. For example, the accelerator 180 may be provided as an intellectual property (IP) to enhance processing performance of text, audio, still images, animation, video, 2-dimensional data or three-dimensional data.

A system interconnector 190 is a system bus to provide an on-chip network in the system-on-chip (SoC). The system interconnector 190 may include, for example, a data bus, an address bus, and a control bus. The data bus is a data transfer path. A memory access path to the working memory 130 or the storage device 170 may be mainly provided. The address bus provides an address exchange path between intellectual properties (IPs). The control bus provides a path to transfer a control signal between intellectual properties (IPs). However, the configuration of the system interconnector 190 is not limited to the above explanation and may further include arbitration resources for efficient management.

According to the above description, the mobile device 100 may detect a thread sharing contexts performed in different cores in the multi-core processor 110 and change thread assignment according to a result of the detection. Thus processing delay or power consumption, which occurs as interdependent threads are executed in different cores, may be reduced.

Figure 2:
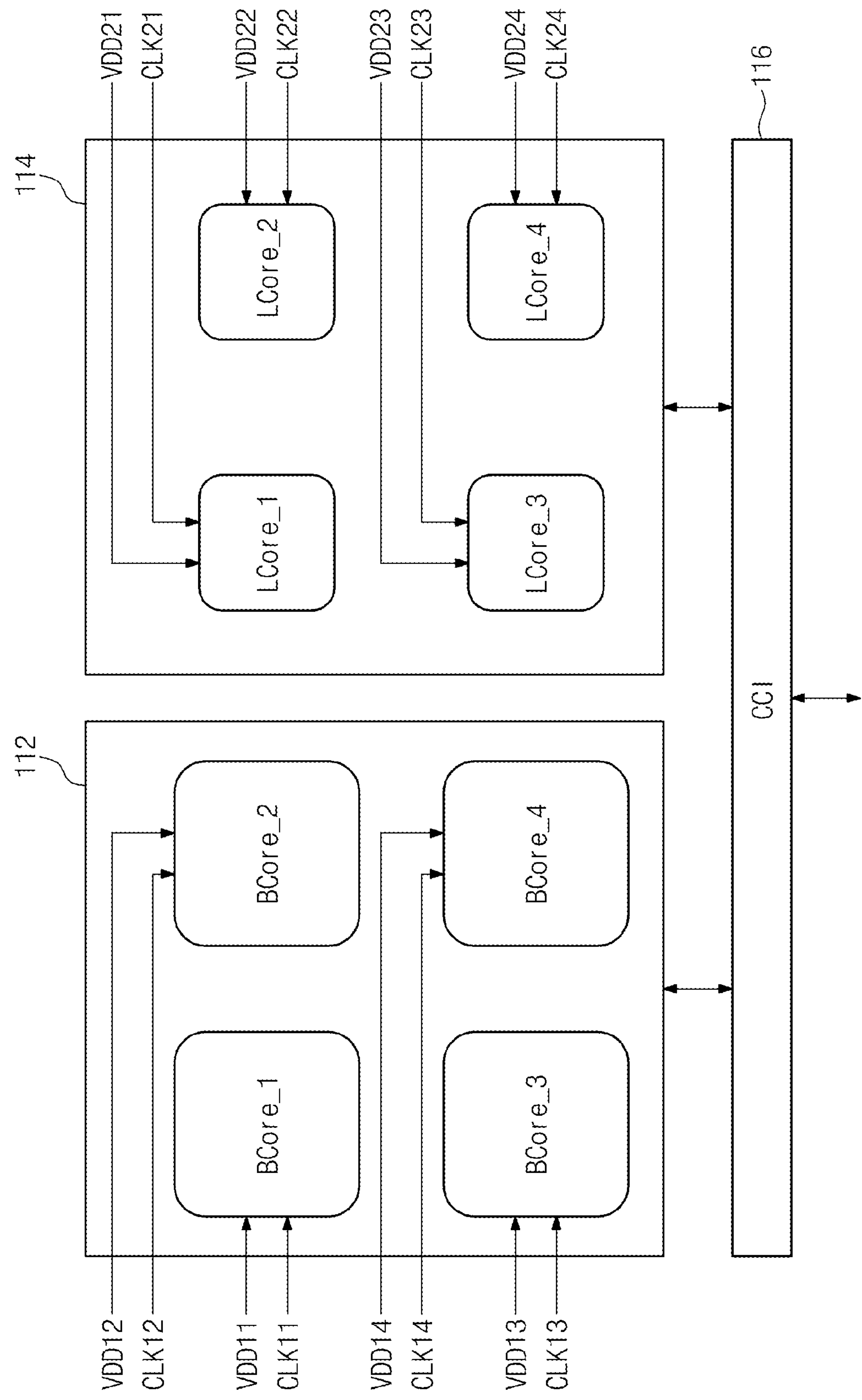
FIG. 2 is a block diagram illustrating a structure of a multi-core processor in FIG. 1.

FIG. 2 is a block diagram illustrating a structure of the multi-core processor 110 in FIG. 1. A multi-core processor 110 including heterogeneous cores is shown in FIG. 2. The multi-core processor may include a first cluster 112, a second cluster 114, and a cache coherent interconnector 116.

The first cluster 112 includes cores BCore_1, BCore_2, BCore_3, and BCore_4 that provide relatively higher processing speed but have great power consumption. Each of the cores BCore_1, BCore_2, BCore_3, and BCore_4 may be allowed to perform an independent operation, and their powers may be independently controlled. That is, the core BCore_1 may receive a power supply voltage VDD11 and a clock CLK11. The core BCore_2 may receive a power supply voltage VDD12 and a clock CLK12. The core BCore_3 may receive a power supply voltage VDD13 and a clock CLK13. The core BCore_4 may receive a power supply voltage VDD14 and a clock CLK14.

The power supply voltages VDD11, VDD12, VDD13, and VDD14 may be provided with the same level or different levels. That is, while one core receives power to be driven, another core may be managed in a standby state, an idle state or a plug-out state. Each of the clocks CLK11, CLK12, CLK13, and CLK14 may be managed with different frequencies or the same frequency. The management of the power supply voltage and the clock may be controlled according to a DVFS scheme.

The second cluster 114 includes LCore_1, LCore_2, LCore_3, and LCore_4 that provide relatively lower processing speed but have high power efficiency. Each of the cores LCore_1, LCore_2, LCore_3, and LCore_4 may be allowed to perform an independent operation. Each of the cores LCore_1, LCore_2, LCore_3, and LCore_4 may include a processor of relatively lower performance than the cores BCore_1, BCore_2, BCore_3, and BCore_4.

As shown in FIG. 2, the cores LCore_1, LCore_2, LCore_3, and LCore_4 may receive VDD21, VDD22, VDD23, and VDD24, respectively. The power supply voltage VDD21, VDD22, VDD23, and VDD24 may be provided with different voltages. A power supply voltage of a specific core may be cut off by scheduling. The cores LCore_1, LCore_2, LCore_3, and LCore_4 may receive clocks CLK21, CLK22, CLK23, and CLK24, respectively. A frequency of each of the clocks CLK21, CLK22, CLK23, and CLK24 may vary depending on a power supply voltage of a corresponding core. That is, frequencies of the clocks CLK21, CLK22, CLK23, and CLK24 may be controlled according to a DVFS manner.

At least one core of the first cluster 112 and at least one core of the second cluster 114 may be used mixed with each other. That is, not only is cluster switching used to select only one of the first and second clusters 112 and 114 but also at least one of the cores of the first cluster 112 and at least one of the cores of the second cluster 114 may be driven at the same time to achieve high performance and power efficiency. This is called heterogeneous multi-processing (hereafter referred to as "HMP").

Enabled cores of the first and second clusters 112 and 114 may execute at least one thread. Cores BCore_1, BCore_2, BCore_3, and BCore_4 may support multi-thread to execute threads sharing the same context in different cores or the same core. The multi-thread may be applied irrespective of the first cluster 112 and the second cluster 114. That is, a thread executed by a single core of the cluster 112 and a thread executed by a single core of the second cluster 114 may have the same context.

The cache coherent interconnector (CCI) 116 supports task migration between the clusters 112 and 114. That is, when the first cluster 112 is disabled and the second cluster 114 is enabled, cache data of the first cluster 112 must be transferred to a cache of the second cluster 114. Moreover, migration of threads sharing a context may be performed in the same manner. The cache coherent interconnector 116 may be provided as a structure for providing data coherency between the clusters 112 and 114.

In general, a thread may be regarded as a basic unit when an operating system (OS) assigns processor time. That is, a thread is an independent processing unit included in a single process and corresponds to a minimum unit of scheduling. In general, a single process may include a plurality of threads. A thread may mean a structure set for storing a thread context according to an exception handler, schedule priority, and system schedule. A thread stores various types of execution environment information such as a register set, kernel stack, and user stack. These types of information are called a context. A context stores information on an operation or work while a thread performs the work and is stored when the work sequence is handed over to another thread.

According to a scheduling manner of the inventive concept, inefficiency occurring in the heterogeneous multi-core processor 110 during a heterogeneous multi-processing (HMP) operation may be reduced. That is, the inefficiency may occur when a thread assigned to a high-performance core and a thread assigned to a low-performance core share the same context. That is, when a thread executed in the high-performance core stands by an execution result of a thread executed in the low-performance core, power consumption remains constant while the high-performance core is in a standby state. Thus, the above-mentioned inefficiency may occur when threads are distributed to cores of different performances while sharing a context.

According to a thread scheduling method of the multi-core processor 110 of the inventive concept, threads sharing a context may be prevented from being distributed to cores of different functions. Thus, power consumption and operation delay occurring during a heterogeneous multi-processing (HMP) operation may be reduced or minimized.

Figure 3:
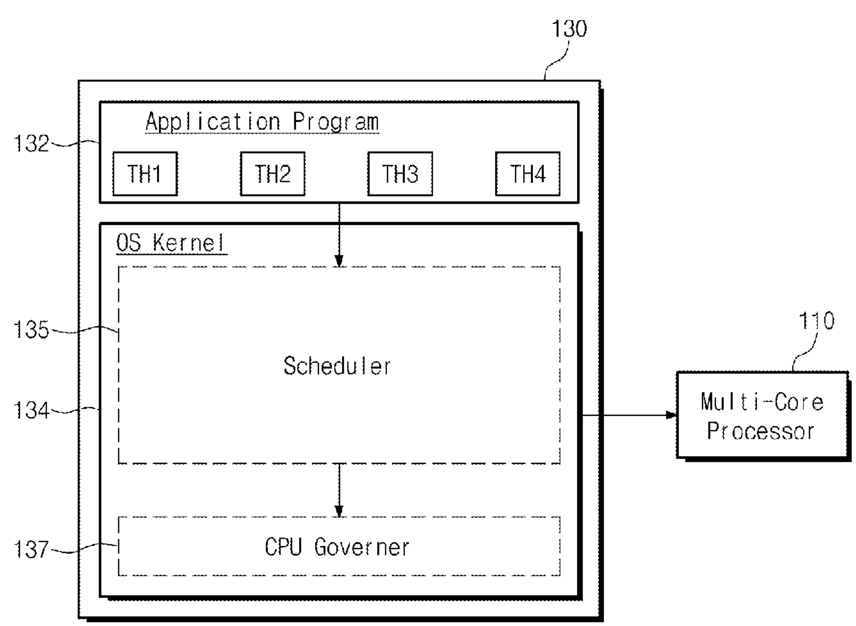
FIG. 3 is a block diagram illustrating a software layer structure of a mobile device in FIG. 1.

FIG. 3 is a block diagram illustrating a software layer structure of the mobile device 100 in FIG. 1. As illustrated, the software layer structure of the mobile device 100 loaded to the working memory 130 and driven by the multi-core processor 110 may be roughly divided into an application program 132 and a kernel 134. Of course, the operating system (OS) may further include a device driver to manage various devices such as a memory, a modem, and an image processing device.

The application program 132 is upper-layer software driven as a basic service or driven by a user request. The application program 132 may generate a plurality of threads TH1, TH2, TH3, and TH4. The application program 132 may generate a process for a specific work. A processor includes at least one thread. For example, when play of a movie file is requested by a user, an application program (e.g., video player) is executed to play the movie file. The executed player may generate a read request or a write request to the storage device 170 to play the movie file requested by the user. These requests constitute a process, and each process may be performed in units of threads.

The kernel 134 performs a control operation between the application program 132 and hardware with the configuration of the operating system (OS). The kernel 134 may include program execution, interrupt, multi-tasking, memory management, file system, device driver, and the like. In the inventive concept, only a scheduler 135 and a CPU governer 137 provided as parts of the kernel 134 will be described below in detail.

The scheduler 135 assigns a thread provided to the application program 132 to each core of the multi-core processor 110. The scheduler 135 may monitor a scheduling event that occurs at the application program 132 or the operating system (OS). When a scheduling event occurs, the scheduler 135 may assign the scheduling event to any one of a plurality of multi-cores according to an average load of a thread to be scheduled. The scheduler 135 may search whether there is a thread sharing a context with a scheduling-requested thread among threads that are already being executed. When a calling thread having the same context is being executed in a high-performance core, the scheduler 135 may perform core switching to execute the scheduling-requested thread in the same core as the calling thread. Through the above procedure, the scheduler 135 may assign threads with the same context to the same core or a core driven with the same function. Thus, power efficiency degradation caused by threads that have the same context but are distributed to cores of different functions may be reduced through the scheduler 135. The detailed configuration of the scheduler 135 will be described later with reference to FIG. 4.

The CPU governer 137 may obtain a driving voltage and a driving clock of the multi-core processor 110 in the kernel 134. A frequency of a driving clock CLK or a level of a driving voltage VDD may be decided according to the driving voltage and the driving clock of the multi-core processor 110. However, it will be understood that the driving voltage and the driving clock of the multi-core processor 110 are not limited to the above described herein. The CPU governer 137 may adjust the level of the driving voltage and the frequency of the driving clock of the multi-core processor 110 according to a request of the kernel 134 or the scheduler 135. Of course, there may be a configuration to adjust the level of the driving voltage and the frequency of the driving clock of the multi-core processor 110 with hardware according to the control of the CPU governer 137 driven in the kernel 134. For example, the performance controller 140 varying a driving clock and a driving voltage of the multi-core processor 110 or various configurations may control the driving voltage and the driving clock of the multi-core processor 110 with hardware according to a call of the kernel 134 that is software.

A thread scheduling method of a multi-core processor performed in the kernel 134 of the operating system (OS) has been described in brief. According to an embodiment of the inventive concept, when a scheduling event of a single thread occurs, it is detected that a thread of the same context is executed in a high-performance core. If a thread having the same context as a scheduling-requested thread is being driven in the high-performance core, the scheduling-requested thread may be reassigned to the high-performance core. Thus, inefficiency occurring when threads having the same context are distributed to cores of different functions may be prevented.

Figure 4:
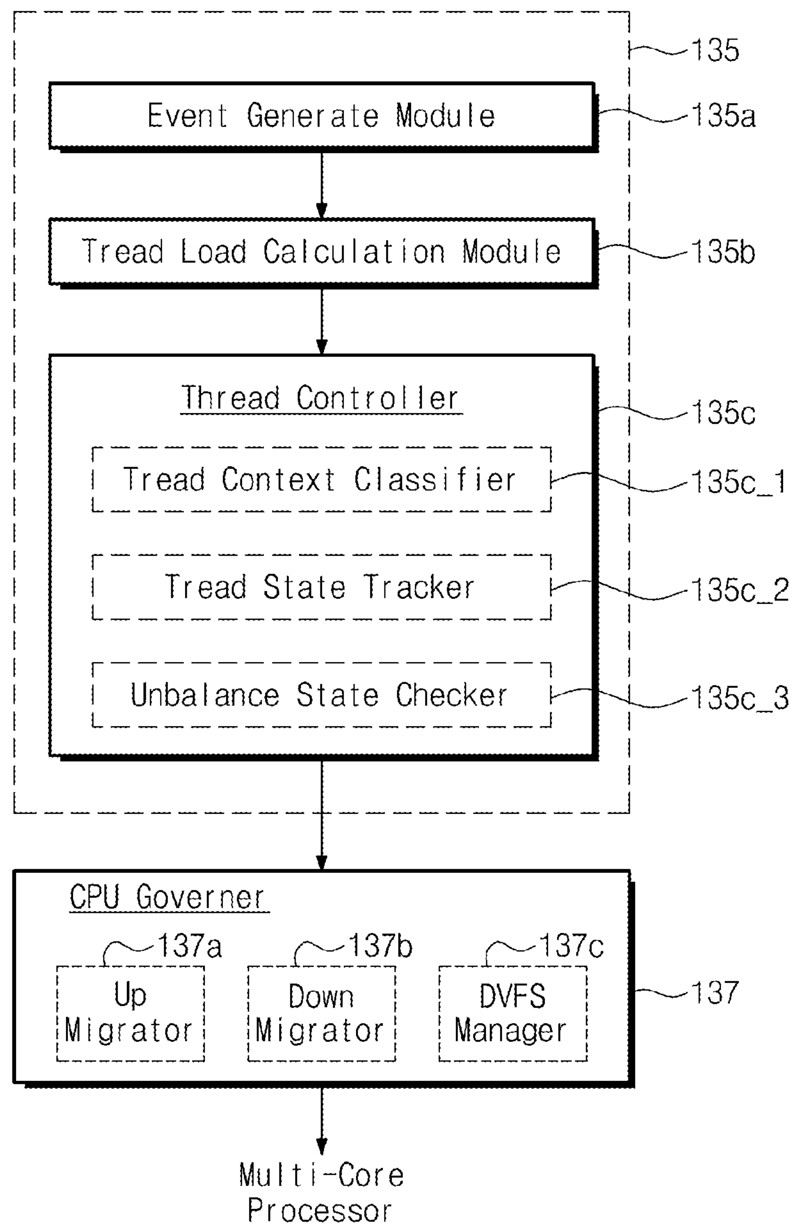
FIG. 4 is a block diagram illustrating the operation of a scheduler according to an embodiment of the inventive concept.

FIG. 4 is a block diagram illustrating the operation of a scheduler 135 according to an embodiment of the inventive concept. As illustrated, the scheduler 135 may include an event generation module 135_a_, a thread load calculation module 135_b_, and a thread controller or control module 135_c_. A CPU governer 137 may allow a selected thread to migrate and control a driving voltage or a clock frequency of a corresponding core according to the control of the scheduler 135.

The event generation module 135*a* detects a scheduling event that occurs at an application program 132 or an operating system (OS). The event generation module 135*a* may assign a corresponding thread to a selected core according to a predetermined scheduling scheme in response to a request for scheduling. Various scheduling approaches may be applied to the predetermined scheduling scheme. For example, according to type of a thread or characteristics of an included processor, a scheduling-requested thread may be assigned to a core to be executed.

The thread load calculate module 135*b* calculates an average load of the scheduling-requested thread. That is, the thread load calculation module 135 may calculate a size of the average load with reference to a size of a queue or a core usage rate in the core primarily assigned by the scheduling-requested thread. When a size of a load generated by the scheduling-requested thread is greater than a reference value, the corresponding thread may be reassigned to a high-performance core. When the calculated average load is equal to or smaller than the reference value, a low-performance core may be assigned to the scheduling-requested thread.

The thread control block 135*c* searches a thread sharing the same context according to an embodiment of the inventive concept and reassigns a core to execute the scheduling-requested thread according to a result of the search. The thread control block 135*c* may include a thread context classifier 135*c*_1, a thread stat tracker 135*c*_2, and an unbalance state checker 135*c*_3 to detect a thread sharing a context with the scheduling-requested thread and reassign the core to execute the scheduling-requested thread with reference to the result of the detection.

The thread context classifier 135*c*_1 searches a thread having the same context as the scheduling-requested thread. That is, the thread context classifier 135*c*_1 may detect whether there are threads sharing a resource with a thread corresponding to a scheduling event. For the detection, the thread context classifier 135*c*_1 may detect context information on a thread register, kernel stack, and user stack in a memory resource. The thread context classifier 135*c*_1 may inform the thread state tracker 135*c*_2 of whether there is a thread having the same context information.

The thread state tracker 135*c*_2 tracks a state of the thread sharing a context with the scheduling-requested thread. The thread state tracker 135*c*_2 may track the type of a core in which a thread sharing a context is executed, a voltage or a clock frequency of the core, a state of the core, and the like. For example, the thread state tracker 135*c*_2 may track whether the core sharing the context is driven in a high-performance mode or a low-performance mode. Alternatively, the thread state tracker 135*c*_2 may track whether a calling thread sharing a context is executed in a big core or a LITTLE core during a heterogeneous multi-processing operation. When the calling thread sharing the context is executed in the low-performance LITTLE core, core reassignment of the scheduling-requested thread need not be performed. When the calling thread sharing the context is being executed in the big core or high-performance core and the scheduling-requested thread is being executed in the LITTLE core or the low-performance core, core reassignment of the scheduling-request thread may be performed.

The unbalance state checker 135*c*_3 checks whether the scheduling-requested thread is a cause of power efficiency degradation or performance degradation with reference to the information provided from the context classifier 135*c*_1 and the thread state checker 135*c*_2. Let it be assumed that a currently scheduling-requested thread is executed in a low-performance core and a calling thread sharing a context is executed in a high-performance core. Under the assumption, the unbalance state checker 135*c*_3 may perform switching to execute the scheduling-requested thread in the high-performance core. On the other hand, when it is detected that the scheduling-requested thread is being executed in the high-performance core, the unbalance state checker 135*c*_3 may control the CPU governer 137 such that a current thread assignment state is maintained irrespective of an execution position of the calling thread sharing the context.

The CPU governer 137 may include an up migrator 137*a*, a down migrator 137*b*, and a DVFS manager 137*c*. The CPU governer 137 may perform thread reassignment of the inventive concept according to a manner decided by the scheduler 135. The up migrator 137*a* may adjust thread assignment to execute the scheduling-requested thread in the high-performance core rather than a current core according to the control of the scheduler 135. Meanwhile, the down migrator 137*b* may adjust the thread assignment to execute the scheduling-requested thread in the low-performance core rather than the current core according to the control of the scheduler 135. The DVFS manager 137*c* may control a driving voltage or a driving clock frequency of each cluster of the multi-core processor 110 according to the control of the scheduler 135. That is, when the number of tasks accumulated on a queue increases, the DVFS manager 137*c* may organically increase the driving voltage and the driving clock frequency of the multi-core processor 110. However, the DVFS manager 137*c* may be applied to the reverse case in the same way.

Figure 5:
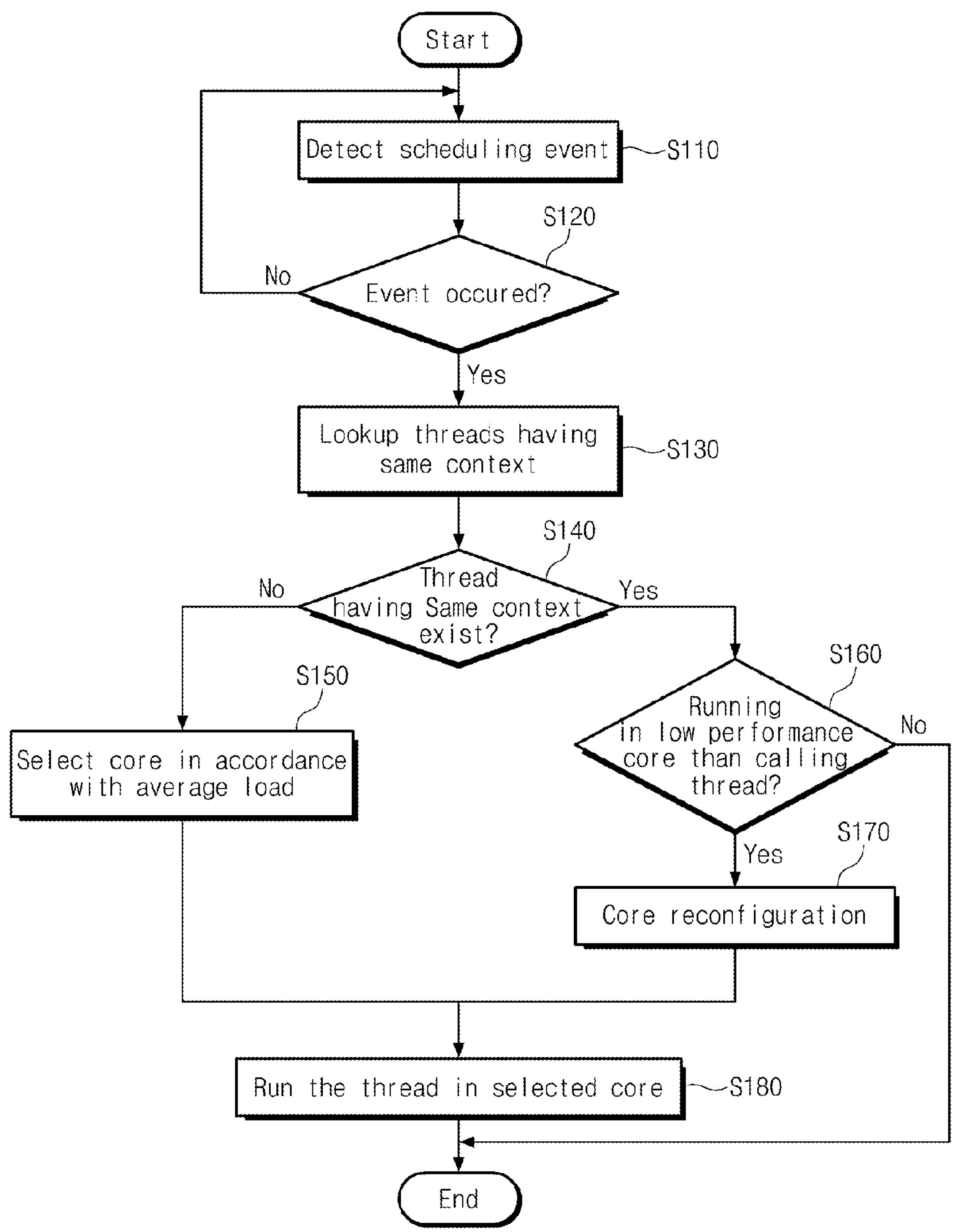
FIG. 5 is a flowchart summarizing a scheduling method according to an embodiment of the inventive concept.

FIG. 5 is a flowchart summarizing a scheduling method according to an embodiment of the inventive concept. Referring to FIG. 5, the procedure of processing one of periodically occurring scheduling events of a thread will be described in brief. When a scheduling event of a single thread occurs, other threads sharing a context may be searched and a core to execute a scheduling-requested thread may be decided according to a result of the search.

A scheduler 135 (see FIG. 3) may monitor and detect a periodically occurring scheduling event of a thread (S110). For the convenience of description, the procedure of scheduling a single thread will be described.

When the scheduler 135 detects the scheduling events (Yes direction after S120), the flow proceeds to S130. When occurrence of the scheduling event is not detected (No direction from S120), the flow returns to S110 to continuously monitor the occurrence of the scheduling event.

The scheduler 135 may extract a context of a scheduling-requested thread to detect a thread having the same context (S130). The scheduler 135 compares contexts of a plurality of threads that exist in a thread pool. For example, the scheduler 135 may search execution information on a thread such as a thread register, kernel stack or user stack to compare contexts of scheduling-requested threads.

The scheduler 135 may determine whether among contexts existing in the thread pool, there is the same context as the context of the scheduling-requested thread (S140). When there is the same context as the context of the scheduling-requested thread (Yes direction), the flow proceeds to S160. When there is no same context as the context of the scheduling-requested thread (No direction), the flow proceeds to S150.

Since there is no thread sharing the context of the scheduling-request thread among currently executed threads, a core may be assigned according to a size of a calculated average load (S150). That is, a single core may be assigned considering the characteristics of the scheduling-requested thread according to a previously decided scheduling scheme.

The scheduler 135 may determine whether the core for executing the scheduling-requested thread is lower in performance than the core to execute the calling thread sharing the context (S160). For example, the scheduler 135 may determine whether the calling thread having the same context as the scheduling-requested thread is driven in a big core and the scheduling-requested thread is executed in a LITTLE core. When the core for executing the scheduling-requested thread is higher in performance than the core to execute the calling thread sharing the context (No direction), the overall procedure for the requested scheduling may be completed. When the core for executing the scheduling-requested thread is lower in performance than the core to execute the calling thread sharing the context (Yes direction), the flow proceeds to S170.

The scheduler 135 may reassign or reset the core to execute the scheduling-requested thread (S170). For example, the scheduler 135 may switch the scheduling-requested thread from a low-performance core to a high-performance core. The scheduling-requested thread may be assigned to the high-performance core to execute the calling thread. Alternatively, handling may be performed to improve performance of the core to execute the scheduling-request thread. That is, a voltage or a clock frequency of a core to currently execute the scheduling-requested thread may be adjusted to be identical to that of the core to execute the calling thread. However, it will be understood that the method of resetting the scheduling-requested thread is not limited to the above described herein.

When the reassignment or resetting of the core to the scheduling-requested thread is completed, the reassigned or reset core may execute the thread-requested thread (S180). When the scheduling-requested thread and the calling thread are executed in the same high-performance core, there may not arise a situation where one of the two threads waits for a time point of operation completion of the other thread.

The scheduling method according to the inventive concept has been described in brief. To control a core of a heterogeneous multi-thread manner, it is detected whether there is a thread sharing a context when a scheduling event occurs. According to a result of the detection, a determination is made on whether or not to reassign a scheduling-requested thread to a high-performance core. According to this thread management method, inefficiency arising from distribution of threads sharing a context to cores of different functions may be reduced.

Figure 6:
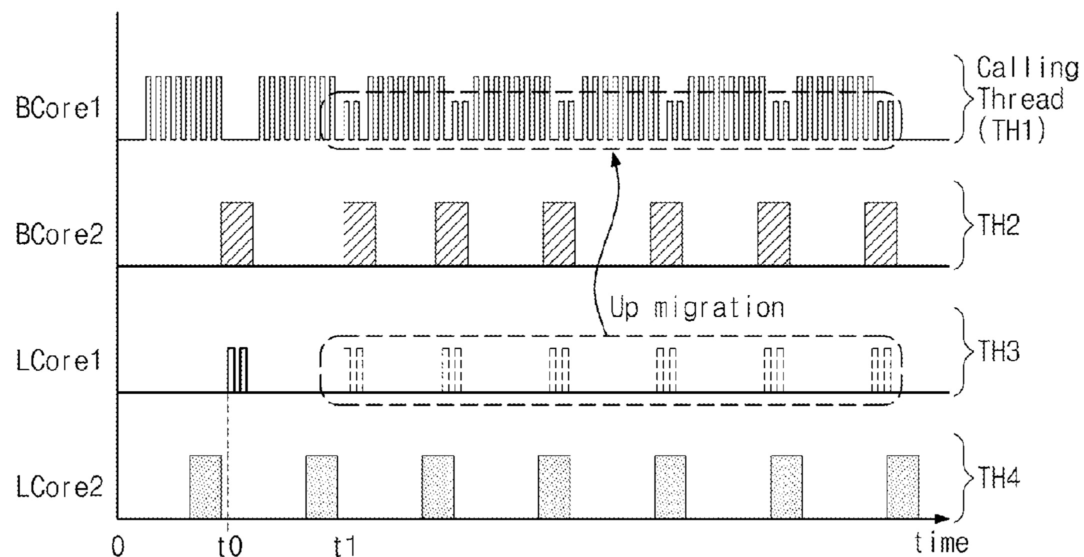
FIGS. 6 to 8 are timing diagrams illustrating a method of selecting or setting a core of a thread by a scheduler according to an embodiment of the inventive concept.
Figure 7:
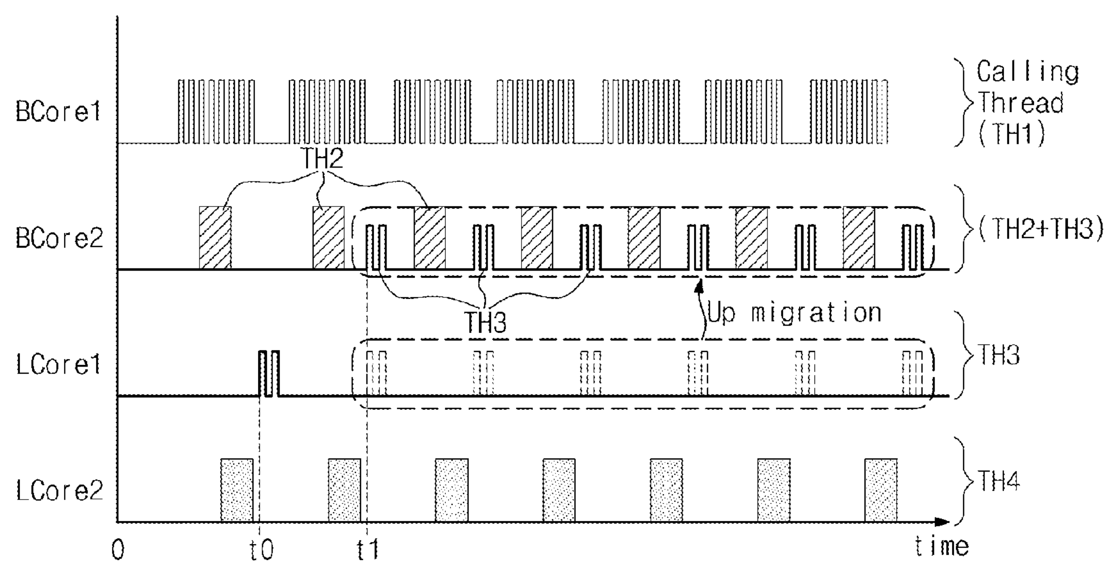
Figure 8:
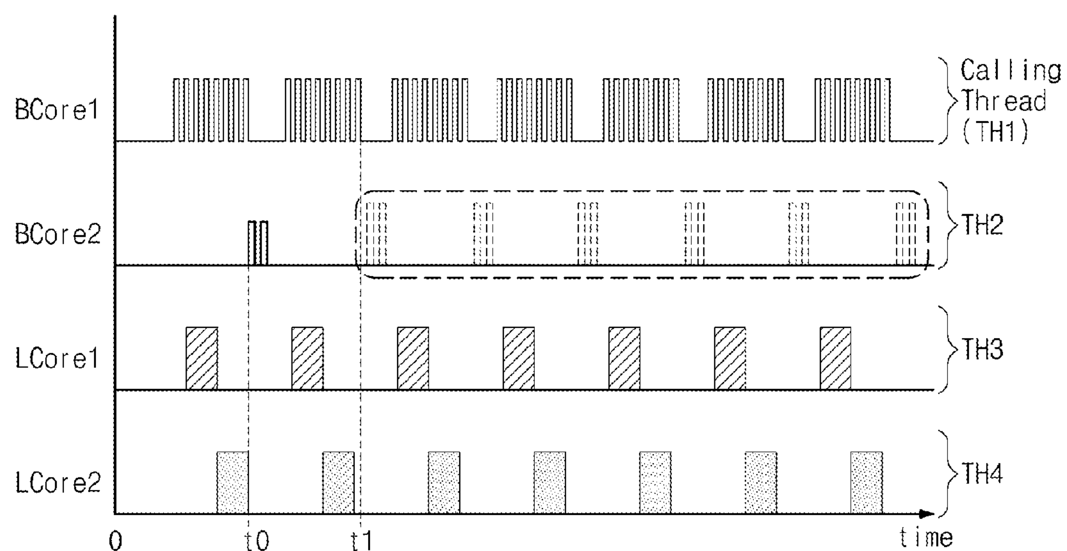

FIGS. 6 to 8 are timing diagrams illustrating a method of selecting or setting a core of a thread by a scheduler according to an embodiment of the inventive concept. FIGS. 6 and 7 illustrate a method of reassigning a core to a scheduling-requested thread, and FIG. 8 illustrates a method of resetting a core executed by a scheduling-requested thread. In this embodiment, a multi-core processor is a heterogeneous multi-core processor having a big.LITTLE™ structure. However, it will be understood that the advantages of the inventive concept may be applied to various multi-core processors which can be controlled with different functions or different driving speeds.

FIG. 6 illustrates up migration of a scheduling-requested thread. Referring to FIG. 6, a third thread TH3 scheduling-requested by a scheduling event is reassigned to a high-performance core from a low-performance core according to a migration procedure.

Let it be assumed that a first thread TH1 is executed in a high-speed big core BCore1, a second thread TH2 is executed in a big core BCore2 driven at high speed, and a fourth thread TH4 is executed in a LITTLE core LCore2 driven at low speed. Let it be assumed that the scheduling-requested third thread TH3 shares a context with the first thread TH1.

At a time point t0, a scheduling even occurs and the third thread TH3 is generated according to a scheduling scheme. The generated third thread TH3 may be assigned to the LITTLE core LCore1 to be executed therein. A thread load calculate module 135*b* of a scheduler 135 may calculate an average load of the third thread TH3 executed in the LITTLE core LCore1. In addition, the scheduler 135 searches whether there is a thread having the same context as the third thread TH3, among threads that are currently being executed. The scheduler 135 may detect that there is the first thread TH1 having the same context as the third thread TH3. The scheduler 135 may detect whether a core to execute the first thread TH1 is a high-speed core or a low-speed core. The scheduler 135 determines whether there is operation inefficiency arising as the first thread TH1 and the third thread TH3 are executed in different cores. According to a result of the determination, the scheduler 135 may reassign the core to execute the third thread TH3 to the high-speed big core BCore1.

From a time point t1, the third thread TH3 may be executed in the big core BCore1 together with the first thread TH1. That is, the third thread TH3 up-migrates to the high-speed big core BCore1 from the low-speed LITTLE core LCore1. Since the first thread TH1 and the third thread TH3 having the same context are executed in the same core, a waiting situation of the big core BCore1 resulting from response delay of the third thread TH3 may be prevented. When there is no thread executed in the LITTLE core LCore1, the LITTLE core LCore1 may be managed by hotplug-out.

According to the timing diagram in FIG. 6, when threads sharing a context are distributed and processed in a high-speed core and a low-speed core, the scheduler 135 schedules to execute a thread executed in the low-speed core in the high-speed core. In particular, if the threads sharing the context are set to be executed in the same core, improvement of operating speed and power efficiency may be increased or maximized.

FIG. 7 illustrates up migration of a scheduling-requested thread, not to a core in which a calling thread is executed, but to another core. Referring to FIG. 7, a scheduling-requested third thread TH3 up-migrates to a high-performance core BCore2 from a low-performance core LCore1. That is, the third thread TH3 migrates to a different core than the first thread TH1.

Let it be assumed that the first thread TH1 is executed in a high-speed big core BCore1, a second thread TH2 is executed in a big core BCore2 driven at high speed, and a fourth thread TH4 is executed in a LITTLE core LCore2 driven at low speed. Let it be assumed that the scheduling-requested third thread TH3 shares a context with the first thread TH1.

At a time point t0, a scheduling event occurs and the third thread TH3 is generated according to a scheduling scheme. The generated third thread TH3 may be assigned to be a LITTLE core LCore1 to be executed therein. A scheduler 135 may search whether there is a thread having the same context as the third thread TH3 in a current thread pool. The scheduler 135 may detect that there is the first thread TH1 having the same context as the third thread TH3. The scheduler 135 may detect whether a core to execute the first thread TH1 is a high-speed core or a low-speed core. The scheduler may determine whether there is operating inefficiency arising as the first thread TH1 and the third thread TH3 are executed in different cores. According to a result of the determination, the scheduler 135 may reassign the third thread TH3 to the high-speed big core BCore2.

From a time point t1, the third thread TH3 may be executed in the big core BCore2. That is, the third thread TH3 up-migrates to the high-speed big core BCore2 from a low-speed LITTLE core LCore1. However, the third thread TH3 and the first thread TH1 may be executed in different big cores BCore1 and BCore2 of the same processing speed, respectively.

Since the first thread TH1 and the third thread TH2 having the same context are performed in the cores BCore1 and BCorew2 having the same function or the same driving speed, processing delay caused by response delay of the third thread TH3 may be reduced or minimized. Furthermore, when a thread executed in the LITTLE core LCore1 does not exist any longer, the LITTLE core LCore1 may be managed by hotplug-out.

The foregoing has been described with respect to an embodiment in which a thread sharing a context up-migrates in a different core than a calling thread. In this embodiment, a relatively larger number of multi-threads are executed in a high-speed core to execute a calling thread TH1. That is, when it is difficult to migrate the scheduling-requested thread TH3 to the same core as the calling thread TH1, the scheduler 135 may select another core of the same speed as the second best approach. When the scheduling-requested thread TH3 migrates to the core of the same speed, a disadvantage arising from processing delay of the third thread TH3 may be overcome.

As described above, when threads sharing a context are distributed to a high-speed core and a low-speed core to be processed, a thread executed in the low-speed core may up-migrate not to a core to execute a calling thread but to another core. In particular, when threads sharing a context are set to be executed in a core of the same function, performance degradation or power inefficiency arising from response delay of any one thread may be reduced or suppressed.

FIG. 8 is a timing diagram illustrating an exemplary method for improving response speed without migration of a scheduling-requested thread. Referring to FIG. 8, a scheduling-requested second thread TH2 is already assigned to a big core BCore2 and a first thread TH1 sharing a context is already being executed in a big core BCore1. However, let it be assumed that an operation mode of the big core BCore2 to execute the second thread TH2 is a low-speed mode.

At a time point t0, a scheduling event occurs and the second thread TH2 is generated according to a scheduling scheme. The generated second thread TH2 may be assigned to the big core BCore2 to be executed therein. A scheduler 135 may search whether there is a thread having the same context as the second thread TH2 in a current thread pool. The scheduler 135 may detect that there is the first thread TH1 having the same context as the second thread TH2. The scheduler 135 may detect whether a core to execute the first thread TH1 is a high-speed core or a low-speed core. The scheduler 135 determines whether there is operation inefficiency arising as the first thread TH1 and the second thread TH2 are executed in different cores. According to a result of the determination, the scheduler decides whether to select another core to execute the second thread TH2 or maintain the current core. Since the second thread TH2 is being executed in the big core BCore2, the scheduler 135 may decide to switch a mode of the big core BCore2 driven in a low-speed mode to a high-speed mode to overcome operating inefficiency.

From a time point t1, the second thread TH2 may be executed in the big core BCore2 without migration. However, a CPU governer 137 may improve a clock frequency and a level of a power supply voltage of the big core BCore2 according to the control of the scheduler 135. That is, the scheduler 135 may switch the processing speed of the big core BCore2 to be equal to that of the big core BCore1 through the DVFS control.

The first thread TH1 and the second thread TH2 having the same context are executed in the cores BCore1 and BCore2 having the same function or the same processing speed, respectively. Therefore, a processing delay arising from response delay of the second thread TH2 may be reduced or minimized.

Figure 9:
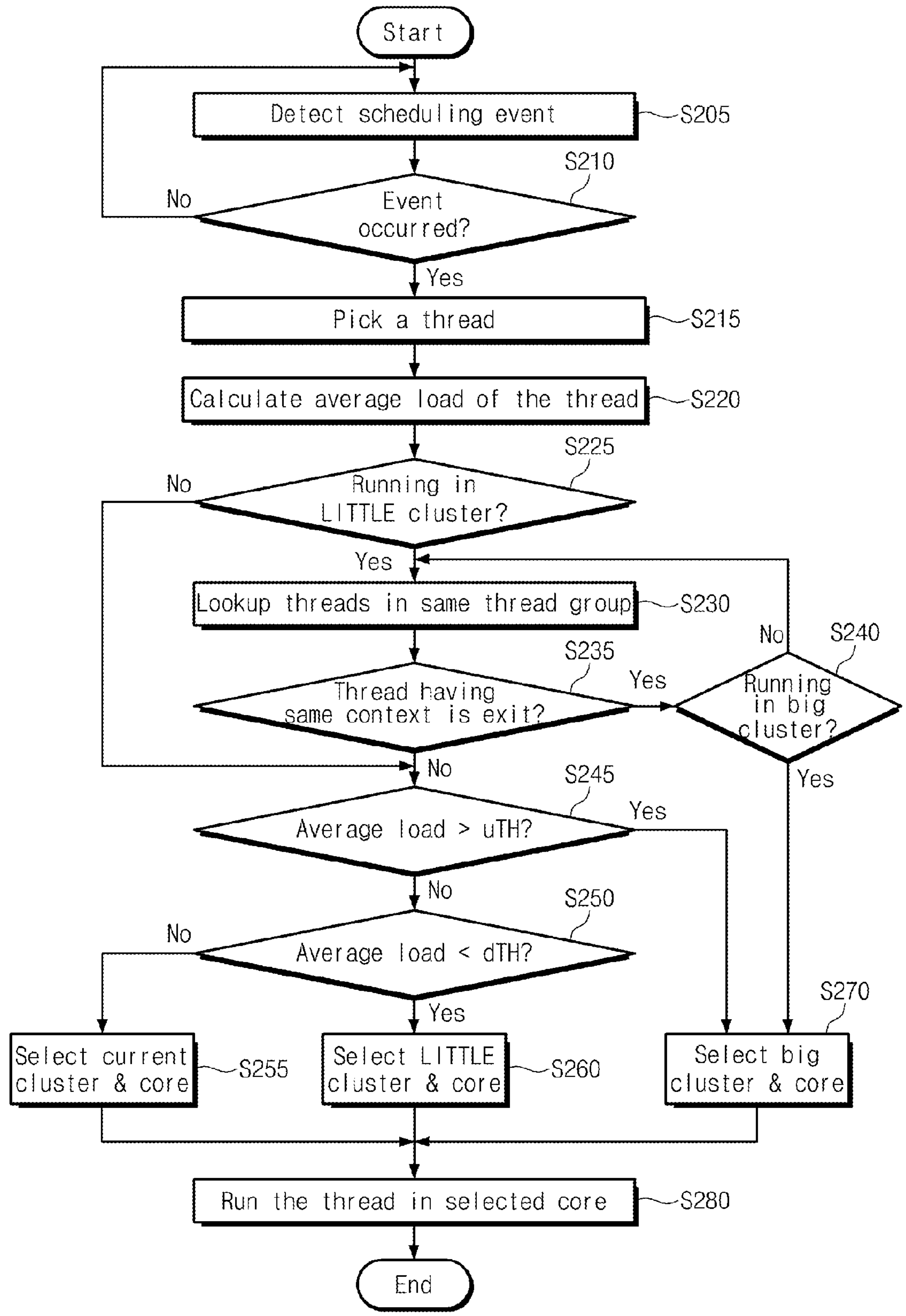
FIG. 9 is a flowchart summarizing a scheduling method of a multi-core processor according to another embodiment of the inventive concept.

FIG. 9 is a flowchart summarizing a scheduling method of a multi-core processor according to another embodiment of the inventive concept. Referring to FIG. 9, advantages of the inventive concept will be described through the procedure of processing a scheduling event for a single thread. When a scheduling event for a single thread occurs, a determination will be made on whether there are threads sharing a context. According to a result of the determination, it is decided whether or not to perform migration of a scheduling-requested thread. This will be described below in further detail.

A scheduler 135 (see FIG. 3) may monitor and detect a periodically occurring scheduling event of a thread (S205).

When the scheduler 135 detects the occurrence of the scheduling event (Yes direction after S210), the flow proceeds to S215. Meanwhile, when the occurrence of the scheduling event is not detected (No direction from S210), the flow returns to S205 in which the scheduler may continue to monitor the occurrence of the scheduling event.

The scheduler 135 may select one of threads where the scheduling event occurs (S215). The selected thread may be assigned to one of a plurality of cores according to a specific scheduling scheme or a predetermined priority.

The scheduler 135 may calculate an average load of a scheduling-requested thread (S220). Various methods may be used to calculate the average load. An example of calculating the average load has been described with reference to FIG. 5 and will not be described here in further detail.

The scheduler 135 determines whether a currently scheduling-requested thread is executed in a low-speed core or a LITTLE core. When the scheduling-requested thread is executed in the low-speed or the LITTLE core, the flow proceeds to S230. Meanwhile, when the scheduling-requested thread is executed in a high-speed core or a big core, the flow proceeds to S245 to perform core reassignment according to the average load.

The scheduler 135 may search a thread having the same context as the scheduling-requested thread (S230). The scheduler 135 compares contexts of a plurality of threads that exist in a thread pool. For example, the scheduler 135 may search execution information on a thread such as a thread register, kernel stack or user stack from the same thread group (or thread pool) for performing multi-threading to compare the searched information with the context of the scheduling-requested thread.

The scheduler 135 may determine whether there is a thread sharing the context of the scheduling-requested thread, among threads that are being executed (S235). When there is the same context as the context of the scheduling-requested thread (Yes direction), the flow proceeds to S240. Meanwhile, when there is no same context as the context of the scheduling-requested thread (No direction), the flow proceeds to S245.

The scheduler 135 determines whether the thread sharing the context of the scheduling-requested thread is executed in a high-speed core or a big cluster (S240). When the thread sharing the context of the scheduling-requested thread is being executed in a different core than the high-speed core or the big core, the flow proceeds to S230 to additionally detect a thread. Meanwhile, when the thread sharing the context of the scheduling-requested thread is being executed in the high-speed core or the big core, the flow proceeds to S270.

The scheduler 135 may select an execution core based on a value of the average load calculated at S220 (S245). For example, when the average load is greater than an upper limit reference value (uTH), the flow proceeds to S270 to select a high-speed core or a big core. Meanwhile, when the average load is equal to or less than the upper limit reference value (uTH), the flow proceeds to S250.

When an average load of the scheduling-requested thread is equal to or greater than a lower limit reference value (dTH) (No), the flow proceeds to S255 to maintain a currently assigned core or cluster. Meanwhile, when the average load of the scheduling-requested thread is less than the lower limit reference value (dTH) (Yes), the flow proceeds to S260 to select a low-speed core or a LITTLE core.

In the flowchart, S255 indicates that the scheduling-requested thread maintains assignment of a temporarily executed core or cluster according to a specific scheme, S260 indicates an operation to select a low-speed core or a LITTLE core as a core or cluster for executing the scheduling-requested thread according to the specific scheme, and S270 indicates an operation to select a high-speed core or a big core as a core or cluster for executing the scheduling-requested thread according to the specific scheme.

The scheduler 135 may control the scheduling-requested thread to be executed in the selected core or cluster with reference to the thread sharing the context (S280).

The foregoing has been described with respect to a scheduling method according to the inventive concept. In core control of a heterogeneous multi-thread approach, when a scheduling event occurs, a determination may be made on whether there is a thread sharing a context. According to a result of the determination, it may be decided whether or not to reassign the scheduling-requested thread to a high-speed or big cluster. According to the thread management method, inefficiency arising from distribution of threads sharing a context to cores of different functions may be reduced or eliminated.

Figure 10:
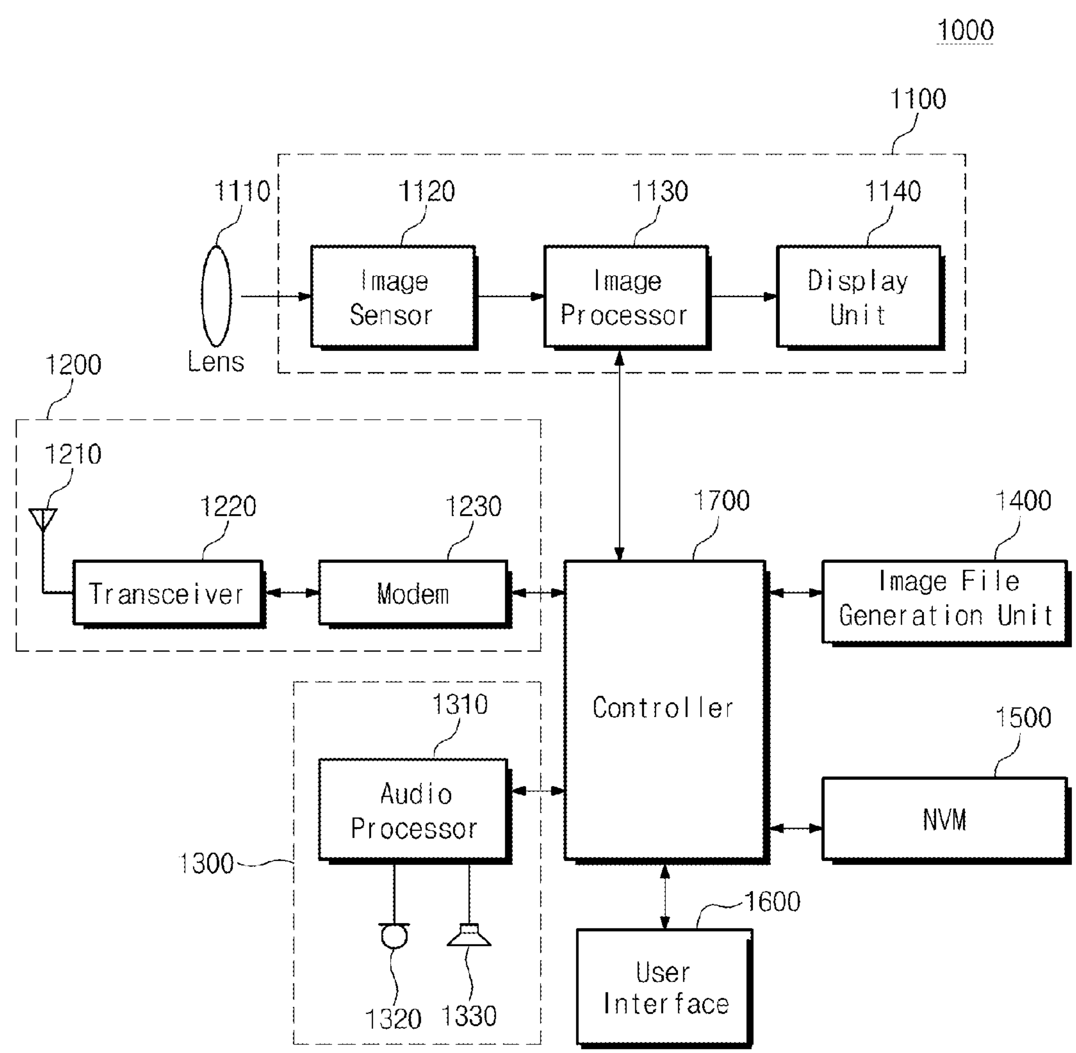
FIG. 10 is a block diagram of a handheld terminal according to an embodiment of the inventive concept.

FIG. 10 is a block diagram of a handheld terminal 1000 according to an embodiment of the inventive concept. As illustrated, the handheld terminal 1000 includes an image processing unit 1100, a wireless transmission/reception unit 1200, an audio processing unit 1300, an image file generation unit 1400, a nonvolatile memory device (NVM) 1500, a user interface 1600, and a controller 1700.

The image processing unit 1100 includes a lens 1110, an image sensor 1120, an image processor 1130, and a display unit 1140. The wireless transmission/reception unit 1200 includes an antenna 1210, a transceiver 1220, and a modem 1230. The audio processing unit 1300 includes an audio processor 1310, a microphone 1320, and a speaker 1330.

The nonvolatile memory device (NVM) 1500 may be provided as a memory card (MMC, eMMC, SD, micro SD or the like) according to an embodiment of the inventive concept. The controller 1700 may be provided as a system-on-chip (SoC) to drive an application program, an operating system (OS), and the like. A kernel of the operating system (OS) driven by the system-on-chip (SoC) may include a scheduler and a CPU governer. The kernel may cut off or correct an operation state in which threads sharing a context are distributed to processors that are enabled at the same time. Thus, efficiency of power or processing speed of an application processor performing heterogeneous multi-processing may be enhanced.

A system-on-chip (SoC) and/or a multi-core processor according to the inventive concept may be packaged as one of various types to be subsequently embedded. For example, a flash memory device and/or a memory controller according to the inventive concept may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), and Wafer-Level Processed Stack Package (WSP).

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the inventive concept as defined by the following claims.

What is claimed is:

1. A scheduling method of a system-on-chip including a multi-core processor, the scheduling method comprising:

detecting a scheduling request of a thread to be executed in the multi-core processor;

determining whether the scheduling-requested thread has a same context as a thread calling the scheduling-requested thread; and reassigning the scheduling-requested thread to a higher-performance core only when both: (1) the thread calling the scheduling-requested thread and the scheduling-requested thread have the same context and (2) a processing speed of a core assigned to execute the thread calling the scheduling-requested thread is higher than that of a core currently assigned to execute the scheduling-requested thread.

2. The scheduling method as set forth in claim 1, wherein the reassigning the scheduling-requested thread comprises reassigning the scheduling-requested thread to be executed in the core assigned to execute the thread calling the scheduling-requested thread.

3. The scheduling method as set forth in claim 1, wherein the reassigning the scheduling-requested thread comprises reassigning the scheduling-requested thread to be executed in a core having a same processing speed as the processing speed of the core assigned to execute the thread calling the scheduling-requested thread.

4. The scheduling method as set forth in claim 1, wherein the reassigning the scheduling-requested thread comprises synchronizing a processing speed of a higher-performance core with that of the core assigned to execute the thread calling the scheduling-requested thread.

5. The scheduling method as set forth in claim 4, wherein the core assigned to execute the thread calling the scheduling-requested thread and the core assigned to execute the scheduling-requested thread are heterogeneous cores.

6. The scheduling method as set forth in claim 1, further comprising calculating an average load of the scheduling-requested thread.

7. The scheduling method as set forth in claim 6, further comprising assigning the scheduling-requested thread to a core in response to determining that the thread calling the scheduling-requested thread does not have the same context as the scheduling-requested thread.

8. The scheduling method as set forth in claim 1, wherein the multi-core processor is driven in a heterogeneous multiprocessing manner to simultaneously drive cores of different functions.

9. A system-on-chip comprising:

a multi-core processor including a plurality of cores having different processing speeds; and a working memory configured to load an operating system and an application program running on the multi-core processor, wherein:

the operating system includes a scheduler configured to assign a core of the multi-core processor to execute a thread according to a scheduling request of the thread generated at the application program, and the scheduler reassigns the scheduling-requested thread to a higher-processing-speed core only when both: (1) the scheduling-requested thread and a thread calling the scheduling-requested thread have a same context and (2) a processing speed of a core assigned to execute the thread calling the scheduling-requested thread is higher than that of the core currently assigned to execute the scheduling-requested thread.

10. The system-on-chip as set forth in claim 9, wherein the multi-core processor comprises a heterogeneous multi-core processor having a big.LITTLE structure.

11. The system-on-chip as set forth in claim 9, wherein: the thread calling the scheduling-requested thread and the scheduling-requested thread have the same context, and the core in which the scheduling-requested thread is assigned to be executed is included in a same cluster as the core in which the thread calling the scheduling-requested thread is executed.

12. The system-on-chip as set forth in claim 9, wherein the scheduler is configured to assign the scheduling-requested thread to one of the plurality of cores according to an average load of the scheduling-requested.

13. The system-on-chip as set forth in claim 9, wherein the operating system includes a central processing unit (CPU) governor configured to control at least one of a driving voltage and a driving clock of the multi-core processor.

14. The system-on-chip as set forth in claim 9, further comprising a performance controller configured to adjust at least one of a voltage and a frequency of the multi-core processor according to the scheduler.

15. The system-on-chip as set forth in claim 9, wherein the scheduler reassigns the scheduling-requested thread so that the scheduling-requested thread migrates to be executed in the core assigned to execute the thread calling the scheduling-requested thread.

16. The system-on-chip as set forth in claim 9, wherein the scheduler reassigns the scheduling-requested thread so that the scheduling-requested thread migrates to be executed in a core having a same processing speed as the core assigned to execute the thread calling the scheduling-requested thread.

17. A handheld mobile device comprising:

a display;

a user interface; and a controller configured to control the display and the user interface, and comprising a system-on-chip including:

a multi-core processor including a plurality of cores having different processing speeds, and a working memory configured to load an operating system and an application program running on the multi-core processor, wherein:

the operating system includes a scheduler configured to assign a core of the multi-core processor to execute a thread according to a scheduling request of the thread generated at the application program, and the scheduler reassigns the scheduling-requested thread to a higher-processing-speed core only when both: (1) the scheduling-requested thread and a thread calling the scheduling-requested thread have a same context and (2) a processing speed of a core assigned to execute the thread calling the scheduling-requested thread is higher than that of the core currently assigned to execute the scheduling-requested thread.

18. The handheld mobile device as set forth in claim 17, wherein the multi-core processor comprises a heterogeneous multi-core processor having a big.LITTLE structure.

* * * * *